Jan. 19, 1971     C. B. BURCKHARDT     3,556,628
RECONSTRUCTION OF INFORMATION STORED
IN ONLY SELECTED AREAS OF A HOLOGRAM

Filed May 29, 1967     3 Sheets-Sheet 1

INVENTOR
C. B. BURCKHARDT
BY
Roderick B Anderson
ATTORNEY

Jan. 19, 1971   C. B. BURCKHARDT   3,556,628
RECONSTRUCTION OF INFORMATION STORED
IN ONLY SELECTED AREAS OF A HOLOGRAM
Filed May 29, 1967   3 Sheets-Sheet 2

3,556,628
RECONSTRUCTION OF INFORMATION STORED IN ONLY SELECTED AREAS OF A HOLOGRAM
Christoph B. Burckhardt, Berkeley Heights, N.J., assignor to Bell Telephone Laboratories, Incorporated, Murray Hill, N.J., a corporation of New York
Filed May 29, 1967, Ser. No. 641,870
Int. Cl. G02f 27/22
U.S. Cl. 350—3.5
10 Claims

ABSTRACT OF THE DISCLOSURE

When the information stored in only selected areas of a first hologram is reconstructed, the other areas of the hologram often impair the reconstruction. To avoid this problem, a second hologram is formed by repeatedly exposing a recording medium to a reference beam and to light from an illuminating beam that is incident on and diffracted by the first hologram. After each exposure, the beam projected from the first hologram to the second hologram is translated a distance equal to the width, in the direction of translation, of a selected area; and a compensating adjustment is made in the angle at which the illuminating beam is incident on the first hologram. Enough exposures are made so that the distance translated equals the distance between adjacent selected areas.

As alternatives, a Lippmann integral photograph may be formed instead of the second hologram or the first hologram may be viewed in real time.

BACKGROUND OF THE INVENTION

Data is usually stored in a hologram by interfering on a recording medium, such as a photographic plate, the wave fronts of two beams of light, one of which wave fronts contains the data to be stored. Proper illumination of the developed recording medium, which constitutes a hologram, reconstructs the stored wave front and therefore the stored data.

The copending application of R. J. Collier, L. H. Lin and K. S. Pennington for "Hologram Techniques," Ser. No. 587,606, filed Oct. 18, 1966, and assigned to Bell Telephone Laboratories, Incorporated, describes a technique for increasing the storage capacity of a hologram. The above application teaches that a mask be inserted in the light beams immediately in front of the recording medium so that the light beams impinge on only small areas of the medium. If the individual areas upon which the recording is made are sufficiently numerous and well dispersed throughout the medium, the recorded information can be reconstructed from the developed hologram by a proper illumination. Typically, a mask of narrow parallel stripes that are alternately transparent and opaque is used for recording.

By thus exposing only a small area of the recording medium to the data to be stored, the amount of information about the data that is stored in the hologram is greatly reduced. This reduction in information stored can be used to advantage in several ways. By reducing the information stored about any given data, it becomes possible to store more information about other data; for example, several more holograms can be stored on a single recording medium. And if the hologram information is transmitted by means such as facsimile, a reduction in the amount of information to be transmitted reduces either the time or the radio frequency bandwidth required to transmit it.

However, the hologram that is produced by Messrs. Collier, Lin and Pennington can be annoying to look at, especially when only a relatively small amount of the hologram area contains the information being reconstructed, because only those portions of the hologram that contain information diffract virtual image light to the eye. Under such conditions, the information is seen by the eye as though it were viewed through the mask used to limit the exposure of the recording medium to small areas. Thus if the mask is an array of parallel stripes, several black lines are seen on the information stored in the hologram. Since the effect is much the same as that of viewing an object through a screen, the phenomenon will be referred to as screen effect.

SUMMARY OF THE INVENTION

Accordingly, it is an object of this invention to improve the reconstruction of information stored in a hologram.

It is a further object of this invention to improve the reconstruction of information stored in limited areas of a hologram.

These and other objects of this invention are achieved in one embodiment of the invention by a process of forming a second hologram of the hologram on which information is stored in only selected areas. A recording medium is repeatedly exposed to the wave fronts of a reference beam and a light beam that is projected through the first hologram and the mask that was used in forming the first hologram. After each exposure, the wave front projected from the first hologram to the second hologram is translated a distance equal to the width, in the direction of translation, of the selected area so that each exposure is slightly different. Enough exposures are made so that the distance translated equals the distance between adjacent selected areas. When the second hologram is properly illuminated and viewed, the information is then seen without the distractions of screen effect. The explanation for this is that the second hologram stores a group of wave fronts that when viewed together appear to pass through the whole area of the plane in which the first hologram is located and not just the selected areas of the first hologram in which the wave fronts are stored.

A convenient way to translate the wave front projected from the first hologram for each exposure is simply to translate the first hologram and the mask used in forming it a distance equal to the width, in the direction of translation, of the selected area. A hologram formed by such a procedure will not produce a screen effect; however, there may be some blurring of the image because the effect of the recording process is to smear the image over the distance between adjacent selected areas. This blurring can be reduced by making compensating adjustments in the direction of the wave front that is projected through the first hologram during each exposure made to form the second hologram.

As an alternative to forming a second hologram, a Lippmann integral photograph may be formed. This process is similar to that used in forming the second hologram; however, the wave front projected from the first hologram is imaged onto the recording medium by an array of spherical lenses, sometimes called fly's eye lenses, and no reference beam is used. Similar translation techniques and adjustments in the direction of the projected wave front are used. Upon reconstructing the Lippmann photograph, a real pseudoscopic image of the information stored is projected from the photograph. By well-known means, a virtual orthoscopic image can be made from the real pseudoscopic image.

In another alternative, the first hologram can be illuminated and viewed without screen effect in real time, thereby obviating the need to make a second recording. Here the first hologram is translated and the beam adjusted fast enough to take advantage of the eye's ability to retain an image for a fraction of a second. As a result, while the eye still senses the wave front from the illumination of the first hologram in its original position, there are incident on the eye other wave fronts that have passed through the hologram when it was in other positions. If the translations are fast enough, this group of wave fronts will appear to have passed through the whole area of the plane of the first hologram, and screen effect will thereby be eliminated.

Inasmuch as the invention makes use of only the reduced amount of information stored in the selected areas of the first hologram, none of the reduction in bandwidth or increase in storage capacity described in the copending application is lost. It is perfectly feasible to transmit the first hologram on a reduced bandwidth to a remote location, reconstruct the hologram there and then either view it directly or form and view a second hologram or a Lippmann photograph.

DESCRIPTION OF THE DRAWING

These and other objects and features of the invention will be better understood from a consideration of the following detailed description taken in conjunction with the accompanying drawing in which.

DETAILED DESCRIPTION

Figure 1:
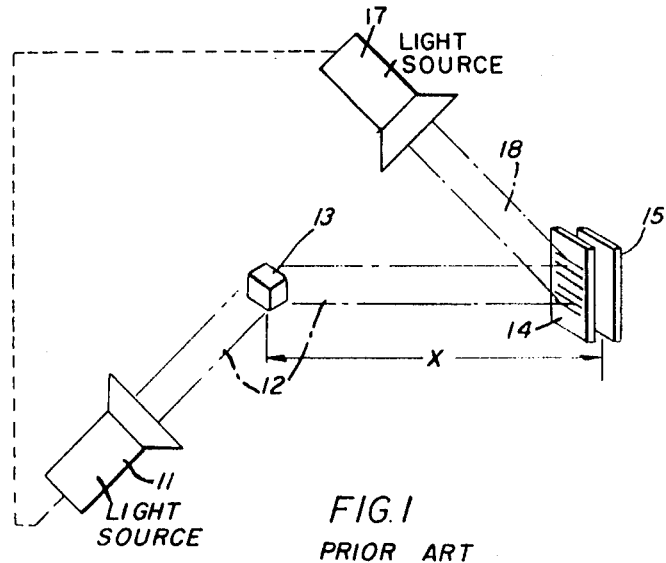
FIG. 1 is a schematic illustration of prior art apparatus used to form a hologram on only selected areas of the recording medium.
Figure 2:
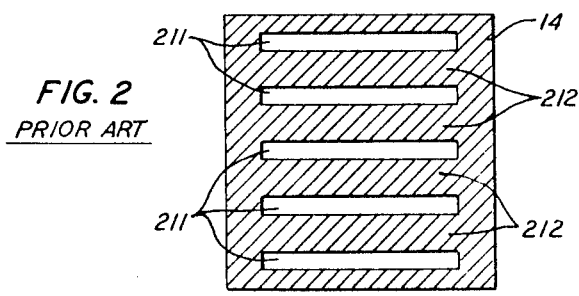
FIG. 2 is a front view of a typical mask used in the apparatus of FIG. 1.

Referring now to FIG. 1, there is shown an illustrative embodiment of prior art apparatus used to form a hologram that stores information is only selected areas. The apparatus comprises a coherent light source 11, a three-dimensional object 13 about which information is to be stored, a mask 14, a photographic plate 15 and a coherent light source 17. A typical mask of transparent stripes 211 and opaque stripes 212 is depicted in FIG. 2. Since reference beam 18 emanating from source 17 should be phase-related to object beam 12 emanating from source 11, it is best to use a system of beam splitter and mirrors to derive reference beam 18 from object beam 12. However, to avoid undue complication of FIG. 1, the common origin of the two beams is indicated by a dotted line between source 11 and source 17.

To form the hologram, coherent light is directed from source 11 onto object 13 whence it is reflected onto photographic plate 15. At the same time, phase-related light is directed from source 17 onto photographic plate 15. Inasmuch as there is an angle between the wave fronts of the object beam 12 and the reference beam 18, a set of interference fringes will be formed in the plane of photographic plate 15. Inasmuch as object 13 reflects object beam 12, the set of interference fringes will be characteristic of object 13.

Because mask 14 blocks part of the light incident upon it, only selected areas of photographic plate 15 will be exposed to the fringe pattern characteristic of object 13. Since only part of photographic plate 15 is thereby exposed to object 13, the unexposed portion can be used to store information from other objects. As explained in the aforementioned copending application, this is done simply by shifting the mask so that it covers that portion of the photographic plate that was exposed during the first exposure and, using another object, repeating the process detailed for exposing object 13. Note that this method uses different areas to store different holograms, contrary to the sometimes practiced method of storing different holograms in the same area but on different spatial frequency bands.

As can be appreciated by those skilled in the art, the above detailed hologram forming technique admits of many variations. For example, object beam 12 could be transmitted through a transparency of the information to be stored rather than reflected off the object; and photographic film or even other media could be used to store the holographic information. Likewise, the mask that is used need not be one of parallel stripes as is the mask described in FIG. 2. As long as the mask is so made that several well-dispersed areas on the photographic medium are illuminated during a given exposure, the information recorded will produce a reasonably good reconstruction of object 13.

After photographic plate 15 has been developed to form a hologram, the stored wave front of object beam 12 can be reconstructed by directing reference beam 18 through mask 14 onto the hologram. However, because only those areas of the hologram that contain the information stored in one exposure will diffract light to a given position, the information will appear as though it were viewed through the mask used during the formation of the hologram. To eliminate this screen effect, I propose several methods, all of which have the effect of putting information into the space on the hologram that is shielded by the mask.

Figure 3:
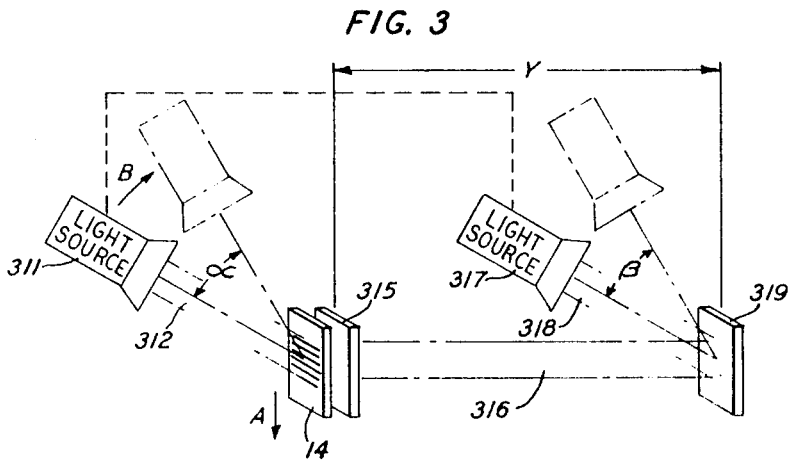
FIG. 3 is a schematic illustration of apparatus used to eliminate screen effect in accordance with one embodiment of the present invention.

An embodiment of one such method will now be explained with the aid of FIGS. 3 and 4. FIG. 3 depicts the apparatus used to form a second hologram of the information stored in only selected areas of the original hologram. The equipment comprises coherent light source 311, the mask 14 of horizontal transparent and opaque stripes used in exposing photographic plate 15, the original, or first, hologram 315 made by developing photographic plate 15, a second coherent light source 317 and a photographic plate 319. Since reference beam 318 emanating from source 317 should be phase-related to illuminating beam 312 emanating from source 311, it is best to use a system of beam splitter and mirrors to derive reference beam 318 from illuminating beam 312. However, to avoid undue complication of FIG. 3, the common origin of the two beams is indicated by a dotted line between source 311 and source 317.

To form the second hologram, illuminating beam 312 is directed from source 311, through mask 14, to first hologram 315 whence it is diffracted along virtual image path 316 onto photographic plate 319. There it interferes with reference beam 318, the wave fronts of the two beams forming a set of interference fringes on the photographic plate.

After this exposure is made, mask 14 and hologram 315 are translated in a vertical direction, as shown by arrow A, a distance $d_t$ equal to the thickness of a transparent horizontal stripe of mask 14; and a second exposure of photographic plate 319 is made. Thereafter mask 14 and hologram 315 are again translated in the same initial direction a distance $d_t$, and a third exposure is made.

Figure 4A:
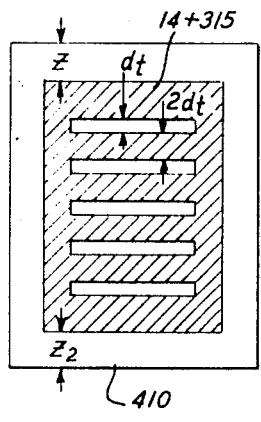
FIGS. 4A, 4B and 4C are front views of three positions of the mask and hologram used in the apparatus of FIG. 3.
Figure 4B:
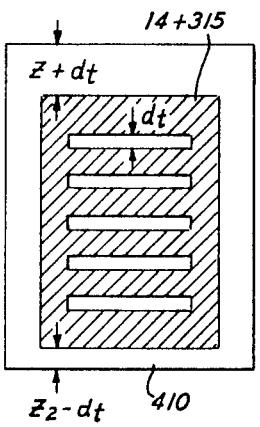
Figure 4C:
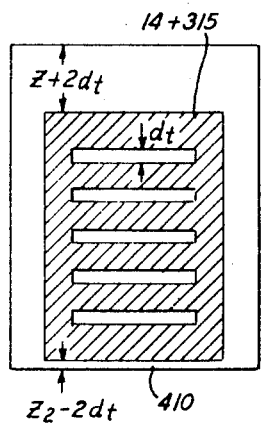

These translations are more clearly illustrated in FIG. 4 which gives three views of mask 14 and hologram 315. In FIG. 4A the mask and the hologram are shown as they are positioned in the first exposure in relation to the reference plane 410. For the second exposure, the mask and hologram are shifted down a distance $d_t$ as indicated in FIG. 4B. For the third exposure, the mask and hologram are shifted down an additional distance $d_t$ so that their total displacement from their original position is $2d_t$.

Figure 5:
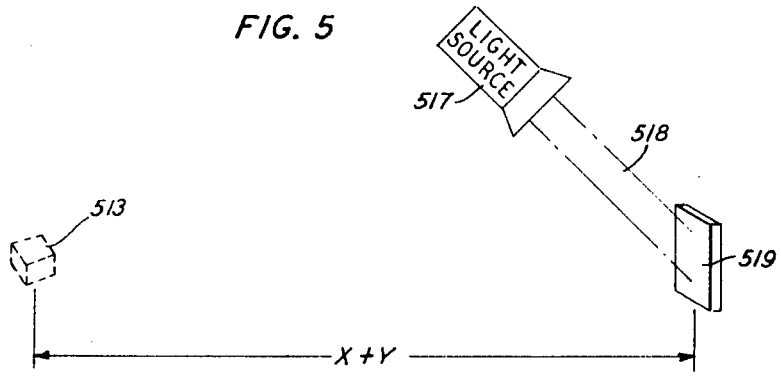
FIG. 5 is a schematic illustration of apparatus used to reconstruct the virtual image of the object stored by using the apparatus of FIGS. 1 and 3.

Once the three exposures are completed, photographic plate 319 is developed. The hologram formed when photographic plate 319 is developed, shown as element 519 of FIG. 5, is then ready for viewing. A light beam 518 is directed from light source 517 onto the interference fringes of hologram 519 to recreate the wave fronts of the virtual image beam. A viewer situate on the other side of the hologram from the light source will then see a virtual image 513 of the original object 13 that was stored in hologram 315. If the distance between the central plane of object 13 and photographic plate 15 of FIG. 1 is $x$ and if the distance between hologram 315 and photographic plate 319 of FIG. 3 is $y$, then virtual image 513 will be located approximately a distance $x+y$ behind hologram 519 in FIG. 5. This image will not be impaired by the distractions of screen effect.

Since the distance between the transparent stripes of mask 14 is twice the thickness of the stripes, only three exposures are needed with the apparatus of FIGS. 3 and 4 to eliminate screen effect. The first exposure makes a record of the interference pattern of the wave fronts of two beams of light, one of which beams has been projected through the selected areas of hologram 315. The second and third exposures make a record of the same two beams of light; but now the first hologram and the mask have been shifted in relation to reference plane 410 of FIG. 4. Hence, though the beam is projected through the same selected area of original hologram 315, it is projected through a different area of reference plane 410.

In all, three closely related sets of intereference fringes are formed on the second hologram. All of these sets contain the same information stored in the reference hologram. But one of these sets associates that information with one area of reference plane 410 while the others associate it with intervening areas of the reference plane. Together the three sets associate their information with the whole area of reference plane 410 and not just one array of stripes.

Thus, when the second hologram is illuminated in FIG. 5, a viewer will see a beam of light that appears to be projected from virtual image 513 through all of the plane in which the first hologram was once located and not just an array of stripes in that plane. Of course, the light that is seen by the viewer actually comes from source 517 and is diffracted to the viewer by second hologram 519. No light comes from virtual image 513 through the plane in which the first hologram was once located; and neither the virtual image nor the plane exists in real space. Nevertheless, to the eye of the viewer, all the light does seem to come from the virtual image through that plane. Hence, just as one speaks of a virtual image, it is also possible to speak of a virtual position on a virtual plane and to describe the effects of the above detailed triple exposure as storing in the second hologram three sets of wave fronts that, when taken together during illumination, appear to come from the virtual image through substantially all of the virtual area of the virtual plane in which the first hologram was once located.

As can be understood from the above description, to eliminate screen effect, enough exposures must be made so that the second hologram stores wave fronts that appear to pass through substantially all the areas of reference plane 410 and not just selected parts. Thus a general formulation of the smallest number of exposures and the smallest number of translations required to eliminate the screen effect on a reference hologram made with a mask of parallel stripes is: if $d_t$ is the thickness of the transparent stripe and $nd_t$ is the distance between the stripes, then $(n+1)$ exposures and $n$ translations of distance $d_t$ must be made to eliminate the screen effect completely. Of course it is not necessary that each translation be of distance $d_t$. The distance can be longer or shorter provided enough exposures are made so that, when the second hologram is illuminated for viewing, the virtual light beam it reconstructs will appear to be projected through substantially all the areas to the plane in which the first hologram was once located.

There are many ways to mask the first hologram and many ways to compensate for this masking. This invention has been described using the example of a mask of horizontal transparent and opaque stripes of specified widths. However, masks of other dimensions or of other patterns—especially one in which a matrix of transparent windows is defined by an array of opaque horizontal and vertical stripes—may be used. Whatever type of mask is used, however, from the above description of the invention, those skilled in the art will understand how to compensate for it by shifting the light incident on photographic plate 319.

Of course translating mask 14 and hologram 315, as is shown in FIG. 3, is only one of several ways of shifting the beam. Many other methods that are essentially the same can be readily devised by those skilled in the art. For example, instead of shifting mask 14 and hologram 315, photographic plate 319 could be shifted for each exposure. Likewise, the position of the beam that is projected from hologram 315 to photographic plate 319 could be shifted by any number of optical techniques. One such technique would be to insert in the beam a refracting medium. No matter what technique be used, however, all these beam shifting techniques are equivalent; for they will form on photographic plate 319 a set of wave fronts that will reconstruct a virtual image beam that appears to have passed through substantially all of the reference plane 410 in which mask 14 and hologram 315 were once situate.

The virtual image that will be reconstructed upon processing photographic plate 319 and then illuminating it may be blurred because the above detailed exposure technique produces a result similar to that produced by exposure of an object that is moved slightly between exposures. The effects of this blurring can be reduced by varying the angle at which illuminating beam 312 is incident on the mask 14 and hologram 315. If beam 312 of FIG. 3 is rotated through angle $\alpha$ that is approximately equal, in radians, to the distance of translation $d_t$ divided by the distance $x$ between the central plane of object 13 and photographic plate 15 of FIG. 1, there will be no blurring in the central plane of the virtual image. As is clear to one skilled in the art, the direction of rotation depends on both the relative position of beam 312 and hologram 315 and the direction of translation. In FIG. 3, if mask 14 and hologram 315 are shifted in the direction of arrow A, then the beam should be rotated in the direction of arrow B.

This compensation for blurring can also be made by rotating beam 318 through angle $\beta$ where $\beta$ is approximately equal to the distance of translation $d_t$ divided by the sum of distance $x$ in FIG. 1 and distance $y$ between the first and the second hologram in FIG. 3.

Figure 6:
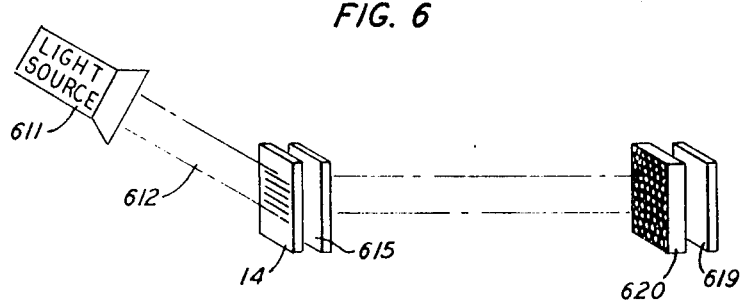
FIG. 6 is a schematic illustration of apparatus used to eliminate screen effect in accordance with another embodiment of the invention.

Instead of forming a second hologram to compensate for screen effect, a Lippmann integral photograph can be formed with the apparatus of FIG. 6. The properties of the Lippmann photograph are more extensively described in H. E. Ives' article "Optical Properties of a Lippmann Lenticulated Sheet," J. Opt. Soc. Amer., 21, 171 (March 1931); and these properties are taken advantage of to form a photograph that can be illuminated to produce a three-dimensional image unimpaired by screen effect. FIG. 6 depicts a coherent light source 611 for projecting an illuminating beam 612, mask 14 of horizontal transparent and opaque stripes used in exposing photographic plate 15, hologram 615 made by developing photographic plate 15, a fly's eye lens 620 and a photographic plate 619 located in the image plane of lens 620. Fly's eye lens 620 is an array of a large number of small spherical lenses.

To form the Lippmann photograph, coherent light is directed from source 611, through mask 14, to hologram 615 whence it is diffracted along a virtual image path to fly's eye lens 620 that images it onto photographic plate 619. After this exposure is made, mask 14 and hologram 615 are translated in a vertical direction a distance $d_t$ equal to the thickness of a transparent horizontal stripe of mask 14. As described above in conjunction with the description of FIGS. 3 and 4, a second exposure is then made and then as many more translations and exposures as necessary to eliminate the screen effect.

Just as with the technique of forming a second hologram detailed in conjunction with FIGS. 3 and 4, there are several possible ways to mask hologram 615 and there are several ways to shift the beam that is projected from hologram 615 to photographic plate 619. Likewise there may be blurring; and if there is, this can be compensated for by varying the angle at which illuminating beam 612 is incident on hologram 615.

Figure 7:
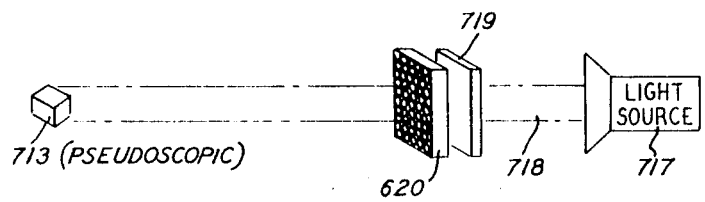
FIG. 7 is a schematic illustration of apparatus used to reconstruct the real image of the object stored by using the apparatus of FIGS. 1 and 6.

The Lippmann photograph that is formed when photographic plate 619 is developed to make a positive, shown as element 719 of FIG. 7, is then ready for reconstruction. A light beam 718 is directed from light source 717 through photograph 719 and through fly's eye lens 620. The light that is projected need not be monochromatic; however, the fly's eye lens that is used in reconstruction must be identical to that used in forming the integral photograph and must be so positioned that each lens is aligned with the image it formed on the photograph. The image 713 that is projected from the Lippmann photograph is three-dimensional, real and pseudoscopic but is not marred by screen effect. Several well-known techniques exist for making a virtual orthoscopic image from the real pseudoscopic image. One of the most straightforward of these techniques is to make still another integral photograph of the real pseudoscopic image.

Figure 8:
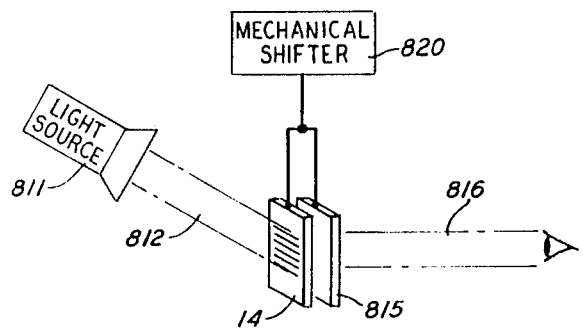
FIG. 8 is a schematic illustration of apparatus used to reconstruct the virtual image of the object stored by using the apparatus of FIG. 1.

Still another method of compensating for screen effect is to translate the first hologram and adjust the beam of light incident on it fast enough so that, to the eye of someone viewing the first hologram, light will appear to come from the whole area of the hologram and not just the selected areas in which the information is recorded. This technique is similar to that detailed for recording with the second hologram or the Lippmann photograph; however, no second recording is made. The viewer's eye is located in the virtual image path 816 as shown in FIG. 8; but the remaining apparatus is the same as that shown in FIG. 3. The equipment comprises coherent light source 811, mask 14 of horizontal transparent and opaque stripes used in exposing photographic plate 15, hologram 815 made by developing photographic plate 15 and a conventional device 820 for shifting mask 14 and hologram 815 rapidly in a vertical direction.

To view the hologram without screen effect, illuminating beam 812 is directed from light source 811 through mask 14, to hologram 815 whence it is diffracted along virtual image path 816 into the eye of the viewer. Meanwhile, device 820 is moving mask 14 and hologram 815 rapidly up and down. If this motion is fast enough, the eye's ability to retain an image for a fraction of a second will eliminate the screen effect; for within a brief period of time the eye will see a group of wave fronts that, when taken together, will appear to have come from the whole area of the plane in which hologram 815 is situate. If the angle of the incidence of illuminating beam 812 on hologram 815 is adjusted in synchronism with the motion of hologram 815, any blurring will also be minimized.

Of course, the mechanical shifter described is only one of several real time techniques for removing screen effect from a hologram in which information is stored in only selected areas. Any technique that can switch onto the eye of the viewer several wave fronts that when taken together appear to come from substantially all of the plane in which the first hologram was once situate will eliminate screen effect.

Whether a second hologram or a Lippmann photograph be used or the first hologram merely be translated fast enough, the virtual image light that is finally viewed appears to come from all points of the plane in which the original hologram was once situate. As a result, this image will have none of the annoying screen effect that has characterized images formed from reference holograms made under the prior art process described in FIG. 1. Furthermore, if compensation for the translation of the mask and hologram is made by varying the angle of the illuminating beam (or, in the case of the second hologram, the reference beam incident on the recording medium) then there will be no blurring in the central plane of the image and little blurring in the other planes.

As can be appreciated by anyone skilled in the art, this invention admits of many variations in its practice. The descriptions of practice that have been given are merely illustrative of what can be done. Numerous other modifications can be made by those skilled in the art without departing from the spirit and scope of the invention.

What is claimed is:

1. A method for reconstructing information holographically recorded on only selected first areas of a first hologram recording medium, wherein second areas of said medium are located between at least parts of some adjacent first areas, comprising the steps of:

forming a first set of interference fringes by interfering on a second recording medium for a first exposure two light beams, one of which beams has been modulated by the information recorded on the selected first areas of the first hologram recording medium;

shifting the position of the modulated beam and the second recording medium relative to each other and forming a second set of interference fringes by interfering the two light beams on the second recording medium for a second exposure; and illuminating both sets of interference fringes recorded on the second recording medium to reconstruct the information therefrom.

2. The method of claim 1 wherein the modulated beam is shifted by moving the first hologram recording medium, relative to the second recording medium and in a plane parallel to that of the recording medium, a distance approximately the thickness of a first selected area in the direction of the shift.

3. The method of claim 1 wherein the modulated beam is shifted by inserting into the beam a refractive medium.

4. A hologram for reconstructing information holographically recorded on a plurality of periodically spaced-apart areas of a first hologram recording medium formed by a process comprising the steps of:

forming a first set of interference fringes by interfering on a second recording medium for a first exposure two light beams, one of which beams has been modulated by the information recorded on the periodically spaced areas of the first hologram recording medium; and shifting the position of the modulated beam and the second recording medium relative to each other a fraction of the distance in the direction of the shift between adjacent periodically spaced areas of the first recording medium and forming a second set of interference fringes by interfering the two light beams on the second recording medium for a second exposure.

5. A method for reconstructing information recorded on a first hologram by illuminating through a mask of alternate transparent and opaque stripes only selected areas of a first recording medium comprising the steps of:

forming a first set of interference fringes by interfering on a second recording medium for a first exposure two light beams one of which beams has been modulated by the mask and the information recorded on the selected areas of the first hologram;

translating the mask and the first hologram relative to the second recording medium and in a plane parallel to that of the second recording medium a distance in a direction perpendicular to the stripes equal to the thickness of a transparent stripe;

forming a second set of interference fringes by interfering the two light beams on the second recording medium for a second exposure;

and illuminating both sets of interference fringes to reconstruct the information therefrom.

6. The method of claim 5 wherein:

the first hologram is formed by interfering on the first recording medium a reference beam and light that has illuminated an object;

the modulated beam is formed by directing a beam of light onto the first hologram at a first angle; and between the first and second exposures, the first angle is changed by an amount equal in radians to the distance the first hologram was translated relative to the second recording medium divided by the distance between the first hologram and the central plane of the object illuminated to form the first hologram.

7. The method of claim 5 wherein:

the first hologram is formed by interfering on the first recording medium a reference beam and light that has illuminated an object;

a first angle is defined at the second recording medium between the two light beams in the first exposure and a second angle is likewise defined between the same two light beams in the second exposure;

and, between the first and second exposures, the angle between the two beams is changed from the first angle to the second angle, the difference between the first and second angles being an amount in radians equal to the distance the first hologram was translated relative to the second recording medium divided by the sum of the distance between the first hologram and the central plane of the object illuminated to form the first hologram and the distance between the first hologram and the second recording medium.

8. A method for reconstructing information recorded on a plurality of periodically spaced-apart areas of a first hologram comprising the steps of:

projecting through the first hologram a first beam of light whereby the beam of light is modulated by the information recorded on the periodically spaced areas of the first hologram;

projecting through the first hologram a second beam of light whereby the second beam of light is modulated by the same information recorded on the same periodically spaced areas of the first hologram and shifting the second modulated beam from the position of the first modulated beam a fraction of the distance in the direction of the shift between adjacent periodically spaced areas of the first hologram.

9. The method of claim 8 wherein:

the first hologram is shifted rapidly from its position during the first projection to a different position for the second projection;

and the two modulated beams are incident on the eye of a viewer.

10. A method for reconstructing information holographically recorded on only selected first areas of a first recording medium, wherein second areas of said medium are located between at least parts of some adjacent first areas, comprising the steps of:

forming on a second recording medium a first image of the information recorded on the first recording medium by projecting through a fly's eye lens a beam of light that has been modulated by the information holographically recorded on the selected first areas of the first recording medium;

translating the first recording medium relative to the second recording medium and in a plane parallel to that of the second recording medium;

forming on the second recording medium a second image of the information recorded on the first recording medium by projecting through the fly's eye lens a beam of light that has been modulated by the information holographically recorded on the selected first areas of the first recording medium;

forming a positive of the second recording medium, thereby forming a Lippmann integral photograph;

and illuminating the Lippmann photograph to reconstruct the information thereon.

References Cited

Gabor et al., Journal of the Optical Society of America, vol. 56, No. 7, pp. 849–861 (July 1966).

Harris et al., Applied Optics, vol. 5, No. 4, pp. 665–666 (April 1966).

Nyburg, X-ray Analysis of Organic Structures, p. 131 (1961), Acadamic Press, New York.

Erdos, IBM Tech. Disclosure Bulletin, vol. 9, No. 3, p. 291 (August 1966).

Brumm, Applied Optics, vol. 5, No. 12, pp. 1946–1947 (December 1966).

DAVID SCHONBERG, Primary Examiner

ROBERT L. SHERMAN, Assistant Examiner